United States Patent
Carrick

[15] 3,639,741
[45] Feb. 1, 1972

[54] AUTOMATIC HIGH-RESOLUTION MASS MEASUREMENT

[72] Inventor: Alan Carrick, Teddington, England
[73] Assignee: National Research Development Corporation
[22] Filed: July 25, 1969
[21] Appl. No.: 844,983

[30] Foreign Application Priority Data

July 26, 1968 Great Britain......................35,894/68

[52] U.S. Cl..................235/154, 250/41.9 D, 340/347 AD
[51] Int. Cl.............................................................H03k 13/02
[58] Field of Search.................340/347; 235/154, 151.35; 250/41.9 D; 232/92

[56] References Cited

UNITED STATES PATENTS 3,512,152 5/1970 Huynh.................................340/347
3,412,241 11/1968 Spence...............................340/347
3,185,820 5/1965 Williams.............................340/347

*Primary Examiner*—Thomas A. Robinson
*Assistant Examiner*—Jeremiah Glassman
*Attorney*—Cushman, Darby & Cushman

[57] ABSTRACT

A hybrid analogue-digital analyzer for the online digitization of electrically recorded mass spectra. The device, which does not incorporate a digital computer, accurately selects peak maxima to provide triggering pulses for timing circuitry, and uses directly controlled buffer storage to reduce the effective rate of data acquisition to that of the average speed of the associated output channel. The analyzer is primarily intended to provide records of complete high resolution mass spectra suitable for off-line computer processing. For real time production of reduced and annotated spectra the analyzer may be used as an active interface directly coupled to a computer.

9 Claims, 8 Drawing Figures

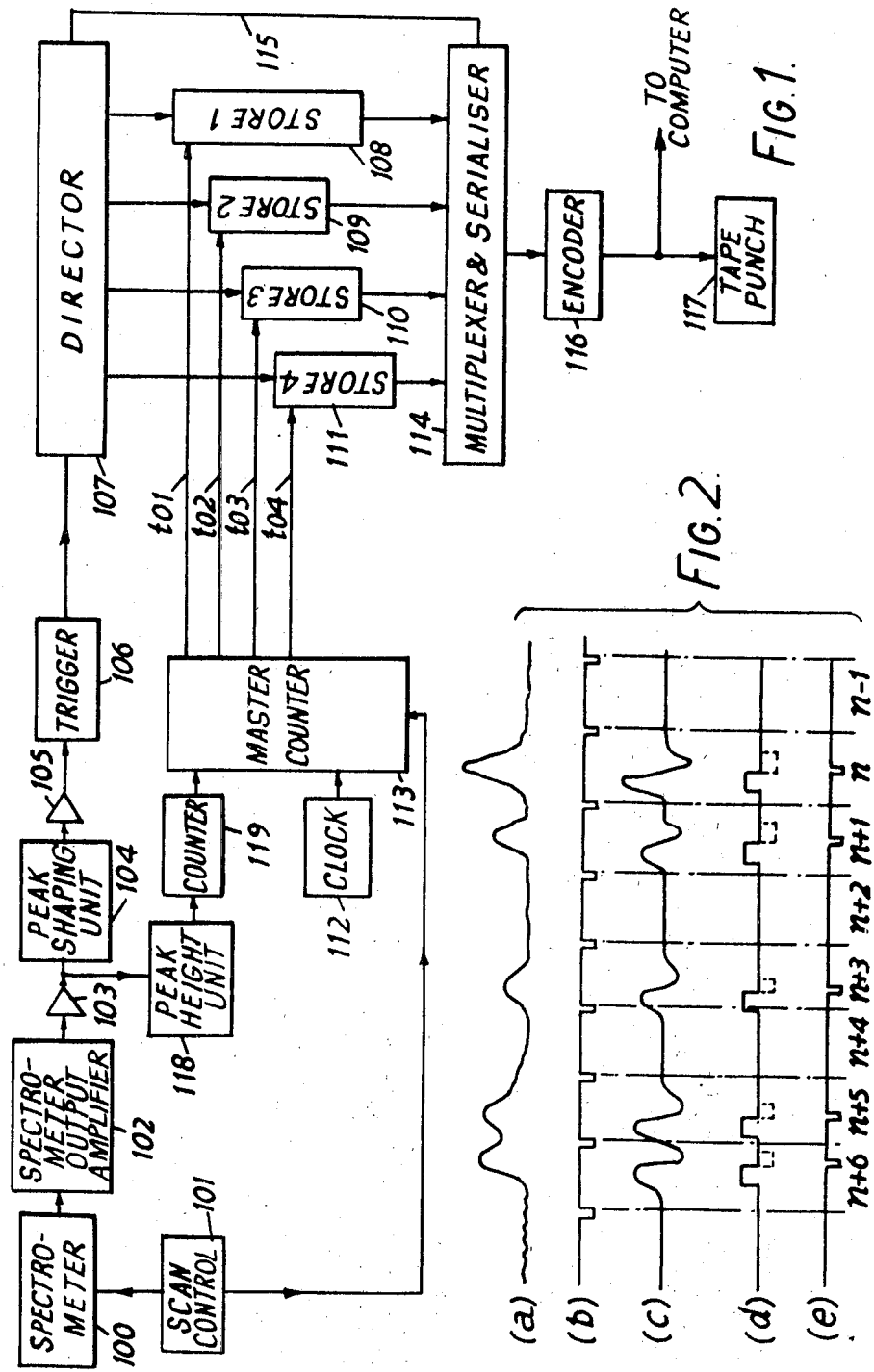

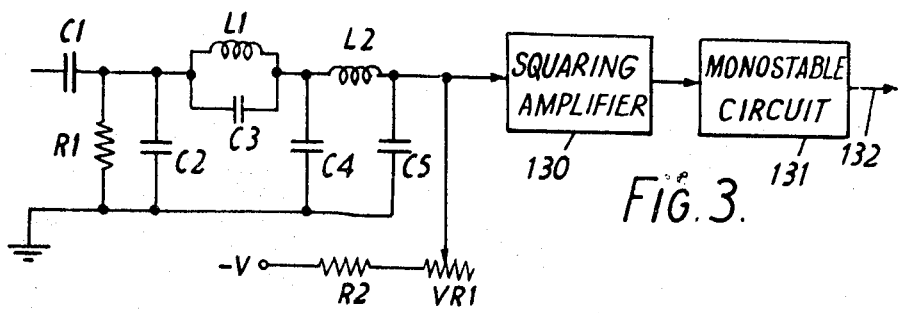
FIG. 3.
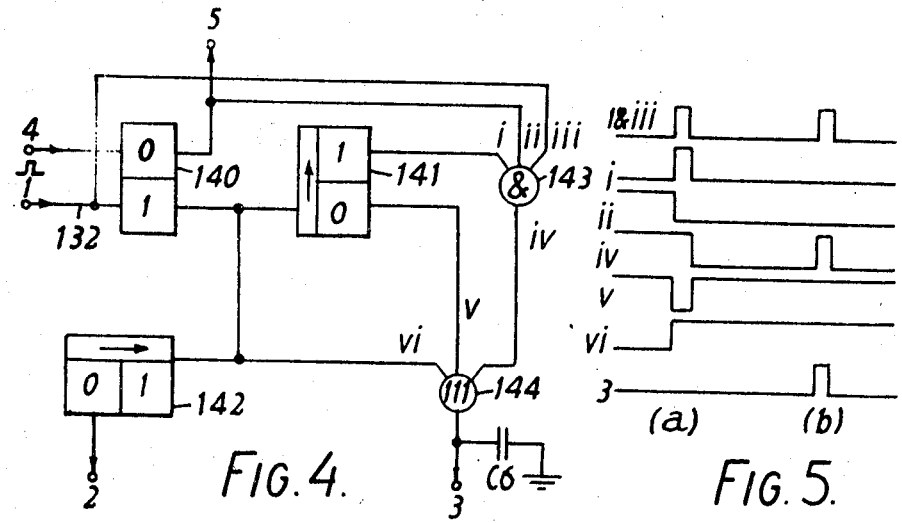
FIG. 4.
FIG. 5.
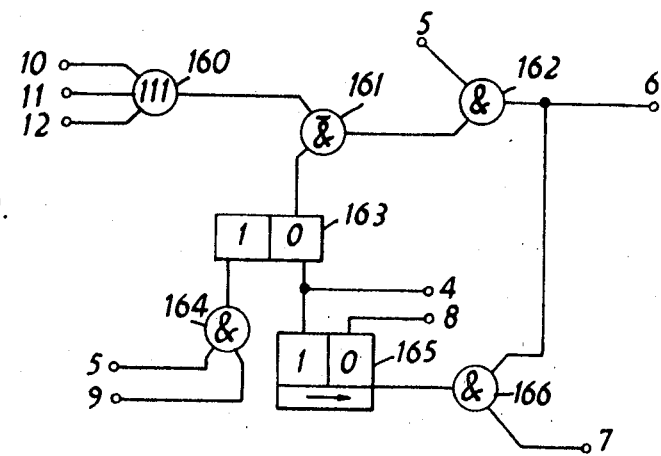
FIG. 6.

AUTOMATIC HIGH-RESOLUTION MASS MEASUREMENT

This invention relates to the analogue-digital conversion of spectra from mass spectrometers, and is more particularly concerned with improved arrangements for processing the output data from a mass spectrometer into a form suitable either for direct input to a computer or for operating a paper tape punch or other recording device.

In mass spectrometry the conversion of the electrically recorded mass spectra into a chemically recognizable form desirably includes the analysis of two parameters of the mass spectral signal. These are, firstly, the position of the spectral peaks with respect to time, and secondly, the magnitude or intensity of the peaks. The first of these parameters is representative of the mass of the ions giving rise to the respective peaks, and the second parameter, which has been established to be reliably indicated by the peak height at maximum for high resolution scans, is representative of the proportion of ion current carried by the particular species in a sample.

One of the major obstacles to the wider and more routine use of automatic data-handling systems in mass spectrometry is the high capital cost of equipment. By far the most expensive item required in currently used systems is the small digital computer used to control the data acquisition process and to reduce the data to a chemically recognizable form. Many laboratories, however, have access to extremely powerful general purpose computing facilities, and so cannot justify the outlay needed for more limited online machines devoted solely to mass spectrometric work. On the other hand, interfacing a mass spectrometer to a large computer can prove difficult and uneconomical because of widely disparate operating modes and speeds, and so some intermediate processing is required. Up to the present time, little attention has been given to the possibility of using punched paper tape—which any large computer can read at high speed—at this intermediate stage.

It is an object of the present invention to provide a mass spectral analyzer which in one mode of operation provides punched paper tape records of complete mass spectra, particularly high resolution mass spectra, in a real-time online process, the punched tape being suitable for direct processing by an off-line computer to obtain the precise mass of each peak digitized and so the chemical formulas of the ions concerned.

All previously known methods of data reduction for electrically recorded high resolution mass spectra employ, at some stage, a computer-controlled analogue-digital voltage converter to sample the signal from the spectrometer.

With spectrometers of the Nier-Johnson type, voltage based analogue-digital converters sampling the record at specific rates have been used. One such analyzer determines the peaks in relation to a voltage (also digitized) derived from the scanning circuitry of the spectrometer. This latter voltage bears some fixed relation to mass number which may be evaluated internally or externally. Such equipment is most easily used in conjunction with voltage-scanning spectrometers. Other analyzer systems use voltage analogue-digital conversion for the spectrum alone, with the peak centroids determined against time (sampling rate). The mass of each peak is determined by a computer which relates the time scale to mass using known peaks from a calibration compound introduced with the unknown sample. This latter system, designed to work primarily at scan speeds of 1 minute per decade or faster, uses presently available general purpose commercial digitizers and computers, with or without intermediate analogue tape recording, and is characterized by a very high cost.

The use of computer-controlled analogue-digital voltage converters, if applied continuously, gives rise to a vast amount of redundant information in the form of "baseline" readings, with the result that thresholding techniques, either before or after digitization, are usually employed. Even so, the speed of the converter-computer combination must be high, in order to satisfy some of the more exacting requirements of a spectrometer working at high resolution and high scan speed. Often in such known systems it is necessary to record the analogue signals on magnetic tape before digitization, thus further increasing the cost and complexity.

The conventional method of analysis thus makes all measurements on the magnitude (or "intensity") of the voltage signal from the spectrometer, and derives information on the position of a peak with respect to time—i.e., the mass of the ion giving rise to the peak in a scanned spectrum—by calculation of a centroid or some similar parameter from a plurality of voltage readings taken at successive time instants across the peak. The sampling rate of the system is usually used as the time scale. When a relatively large number of voltage readings is taken, this amounts to a peak profile mapping procedure.

In theory, however, all peaks in a perfect mass spectrum should have the same profile. Nier and Nier-Johnson type spectrometers, in particular, can be adjusted so that all peaks within a spectrum are isosceles triangles, this triangular peak form being the result of the convolution of a rectangular cross section ion beam (generated by the source slit) with a rectangular detector slit. Many factors cause the behavior of a practical spectrometer output to depart from theoretical expectations, but it has been established that even under fast scanning conditions, for beams containing many ions (that is a signal not limited by statistical processes), the basic assumption of a triangular peak distorted by the finite bandwidth of the recording system of the spectrometer is a close approximation to the actual output waveform. Under these conditions, full profile mapping is unnecessary for the determination of peak positions, as these are sufficiently identified by the exact time of incidence of the peak maxima. In practice, this means that exact mass measurement can be achieved by recording only one parameter per peak, the time at which it reaches a maximum.

It is therefore an object of the present invention to produce from the mass spectra just sufficient data to specify the position of a peak exactly, and no more; in other words, one value of time for a well-shaped peak, and one corresponding to each maximum of a ragged peak.

As has already been mentioned, a measurement of the peak height at maximum gives a reasonably reliable indication of peak intensity for high-resolution scans, and so the data acquisition problem can be further reduced, in that the two important spectral parameters mentioned above can be obtained by taking only two readings for each peak, one of time and one of amplitude.

The mass spectrum analyzer according to the present invention provides results which compare favorably with those obtained by the above-noted known systems. The analogue-digital system of the present invention is capable for example of the online digitization of mass spectra over a range of spectrometer scan speed and resolution from 20 seconds/decade at resolution 1,000 to 2,000, to 500 seconds/decade at resolution 10,000 to 15,000, with further considerable increases if transistor-transistor logic and magnetic data stores are used in place of conventional electrical circuitry and shift registers.

In accordance with the present invention there is provided a mass spectrum analyzer comprising analogue means detecting the maximum of each peak of the spectrometer output signal and therefrom providing one-time coincident control signal for each peak to define the positions of the peaks in time, signal generating means providing successive scan time-indicating signals, and director means using said control signals to direct the simultaneously available scan time signals to an output interface arranged to be directly coupled to an online computer or to recording means operative to provide a record suitable for application to an off-line computer.

Preferably, the analyzer includes buffer storage means into which said selected scan time signals are initially directed under the control of said director means, and encoder means at the output side of said buffer storage means for converting the signalled scan time signals into a form suitable for application to said output interface.

The analogue means may comprise a differentiating circuit providing the waveform derivative of the spectral signals, and a trigger circuit operative to provide a pulsed control signal in response to the cutting of a datum level by the differentiated waveform.

In order that the nature of the invention may be fully understood one particular embodiment thereof and a modified development will now be described by way of illustrative example and with reference to the accompanying drawings, in which:

FIG. 1 is a block schematic diagram of an analogue-digital mass spectrum analyzer in accordance with the invention;

FIG. 2 constitutes waveform diagrams (a) to (e) illustrative of the waveforms present at selected points of the analogue unit in FIG. 1;

FIG. 3 is a circuit diagram of differentiation and trigger circuits used in the analyzer of FIG. 1;

FIG. 4 is a logic circuit of one of four identical sections of the direction of FIG. 1; FIG. 5 shows various waveforms present in the director shown in FIG. 4;

FIG. 6 is a logic circuit of one of four identical sections of the multiplexer of FIG. 1;

Figure 7:
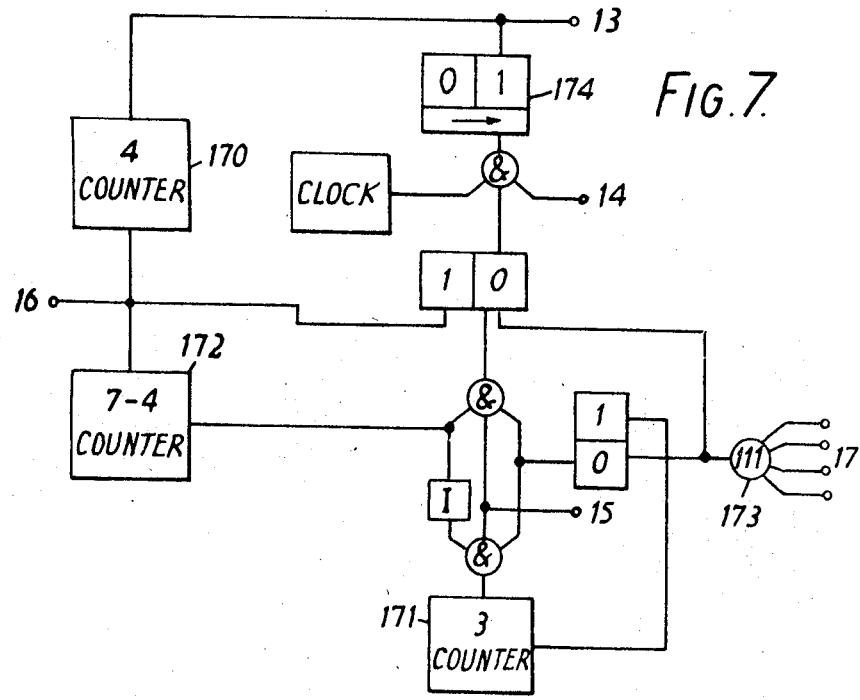
FIG. 7 is a logic circuit of the serializer of FIG. 1.

When a spectrum is scanned logarithmically in terms of mass at constant resolution, all peaks should not only be triangular but also have the same baseline width. Their maxima will then all lie at the same point in relation to the peak onset. These facts do not provide a readily accessible means of determining peak maxima, however, because of the difficulty in the detection of the relatively slow transition through the rather indefinite onset point. The identification of a peak maximum by a sensing device set above the baseline level in a region of faster rate of signal change would be subject to considerable errors because of the widely differing slopes of the leading edges of peaks.

The present invention is based on the fact that it is possible, by taking the first derivative of the spectral signal, to identify for any peak, whatever its intensity, a point which can be used to activate a triggering circuit and which locates the peak maximum exactly. At this maximum the first derivative is independent of peak height and is precisely zero.

As will be described in more detail later, this differentiation procedure can be achieved electrically. Thus it is possible in one analogue stage to produce a signal which precisely defines the position of a peak in time (i.e., its mass) and which yields a single accurate value for the quantity without the necessity of evaluating a centroid or any other parameter. A peak position is in this way determined without reference to intensity; separate circuitry is used to record the peak heights as will become apparent hereinafter.

Referring to FIG. 1 of the accompanying drawings, there is shown a spectrometer 100 controlled in operation by a scan control circuit 101 and having a spectrometer output amplifier 102 associated therewith. The output signal from the amplifier 102 may be, for example, of the general form as shown by the amplitude/time waveform of diagram (a), FIG. 2, and is applied through amplifier or attenuator means 103 to a peak shaping unit 104.

The shaping unit 104 essentially comprises a filter network including differentiating means which reduce the substantially triangular or gaussian waveform peaks to a form similar to that shown in diagram (c), FIG. 2, where the passage of the differentiated output voltage through a zero datum level marks the turnover point of the related peak of the spectrometer output signal. Within any one scan, timings are made relative to an arbitrary zero through the same network and so the imperfect characteristics of the differentiator do not give rise to error, because any displacement of differential zero crossing points from this source is the same for each peak and may be regarded as a displacement in the zero time point. After further amplification or attenuation, as necessary, in circuit 105, the differentiated output voltage is then used to operate a trigger circuit 106 which may include a Schmidt trigger circuit device and which is operative to produce a squared pulse waveform as shown, for example, in diagram (d), FIG. 2 and therefrom a series of narrow pulses as shown in diagram (e), FIG. 2 whose respective leading edges coincide in timing with the tips or turnover points of the successive peaks of the input waveform, FIG. 2a. The amplifier or attenuator circuits 103 and 105 permit suitable adjustment of the signal voltage levels for handling by the logic levels common to the system.

The pulsed output from the trigger unit 106 is applied to a director circuit 107 which is, effectively an automatic address unit controlling the availability for use of a set of four data stores or registers 108, 109, 110, 111 and which will be referred to later.

A master clock pulse source 112 provides a series of timing pulses at regular known intervals, for example at a frequency of 10 kHz., as shown for example in diagram (b), FIG. 2. These clock pulses are fed to a master counter 113 which is itself controlled from the scan control circuit 101 of the spectrometer 100 to commence a new count cycle in coincidence with the start of each spectrum scan of the spectrometer. This master counter 113 is operative to provide on each of four output lines to1, to2, to3 and to4 a series of progressively increasing multidigit parallel mode binary coded decimal numbers indicative respectively of the total number of unit time intervals between successive pulses from the pulse source 112 measured from the instant of commencement of each scan cycle. In consequence, each numbered timing interval can be identified with a particular mass within the scanned spectrum The director circuit 107 is operative, upon receipt of the first pulse (see FIG. 2e) from the trigger circuit 106, to render the first store 108 operative to register thereon the particular elapsed time number then being signalled over the counter outputs to1–to4. At the same time the other stores 109, 110 and 111 are inhibited. Immediately after effecting such registration in store 108, a multiplexer and serializer 114, which is intercoupled with the direction 107 over a line 115, becomes effective to read out the time elapsed number just registered in store 108 into an encoder or equivalent circuit 116 which serves to convert the time interval number into an appropriately coded version for effecting operation of a paper tape punch 117. While such readout is taking place, store 108 is rendered inaccessible by the director and any further arriving pulse (FIG. 2e) from the trigger circuit 106 causes the direction 107 to render the next store 109 operative to register the then available time interval number or output from the counter 113. This second store 109 commences to read out to the encoder 116 through the multiplexer 114 when the first store 108 has been cleared. If the next peak-indicating pulse arrives after the first store 108 has been cleared then this first store is again used but if both stores 108 and 109 are still uncleared, the direction 107 causes the third store 110 to become operative, and so on.

In this way a spectral multiplet of four peaks can be measured and stored whose minimum time spacing corresponds to the maximum working frequency period of the logic units (which may be as high as megacycles), with the provision that the next peak does not occur within the unload time of the first store 108. For example, the system may have a maximum overall handling speed of approximately 20 (unevenly spaced) peaks per second, which is considered adequate to cope with multiplet peaks in 100 seconds/decade scans of masses below about 800.

As shown in FIG. 1, instead of using the output from the encoder 116 as the interface to a tape punch 117 the system may be used as an active interface directly coupled to a computer or other arithmetic unit. Depending upon the computer facilities the output to the computer may be taken from before the buffer store instead of from the encoder 116.

Preferably, the basic signal output (FIG. 2a) from the amplifier or attenuator 103 is additionally applied to a peak height sensing unit 118 which is operative to provide a digital form signal output indicative of the instantaneous amplitude of the spectrometer output. Such peak height sensing unit conveniently comprises a group of, say, nine Schmidt trigger circuits with appropriately different triggering levels to which the input waveform is applied and which, as they successively turn on or off, provide add or subtract pulses respectively to a reversible four-stage binary counter 119 whose parallel-mode binary coded decimal output is fed to a further channel in each of the outputs to1–to4 of the master counter 113 for entry into the selected stores 108, 109, 110, 111 with each mass-identifying time-interval signal for eventual encoding and recording.

Certain parts of the system shown in FIG. 1 will now be described in more detail. A shift register configuration is used for storage allowing "single-sided" parallel mode entry and serial output. All the stores 108–111 and the master counter 113 operate in 1-2-4-8 binary coded decimal mode. The first store 108 and the master counter 113 consists of seven decades and the stores 109, 110 and 111 each consists of four decades gated to the least significant end of the counter.

FIG. 3 shows the peak shaping and trigger circuits represented in FIG. 1 by 104 and 106 respectively. The peak shaping circuit includes a differentiator R1, C1 having a time constant of 2 msec. and works satisfactorily on peaks 10–20 msec. wide. The differentiated signal feeds an unbalanced filter comprising L-C "m-derived" and "prototype" $\pi$ sections of nominal impedance 10 k$\Omega$ and cutoff frequency 2 kHz. constituted by inductances L1 and L2 and capacitances C2, C3, C4 and C5. The filter output is fed to a squaring amplifier 130 and then to a monostable multivibrator 131 to produce a standard 10 $\mu$sec. pulse which is applied to the input of the director 107 on lead 132. A voltage offset for the squaring amplifier 130 is derived from a small voltage source a resistor R2, and a potentiometer VR1, the potentiometer providing an adjustable triggering level.

The director 107 consists of four identical sections connected in series. One of these sections is shown in FIG. 4 where the input line 132 carries the 10 $\mu$sec. pulses from the trigger circuit. FIG. 5 shows the waveforms present at certain points in the director circuit for two different circumstances, the logic states being those at the gate leads as numbered in FIG. 4.

The director section shown in FIG. 4 comprises a bistable circuit 140, two monostable circuits 141 and 142, an AND-gate 143, and an OR-gate 144. When a 10 $\mu$sec. pulse from the trigger circuit is fed to the set input of the bistable circuit 140 the waveforms of part (a) of FIG. 5 apply, and the monostable circuit 141 and gates 143 and 144 blanket the pulse and maintain a "low" output (logic 1) at terminal 3, the input to the next director section. A pulse for gating the associated store 108, 109, 110 or 111 to the master counter 113 is provided at terminal 2 by the monostable circuit 142 which fires when the controlling bistable circuit 140 switches. A further pulse applied to terminal 1 before the bistable circuit 140 is reset does not affect the bistable circuit but passes straight through the gates into the next director section, as shown by part (b) of FIG. 5. Terminal 4 carries reset pulses for the bistable circuit 104 from the multiplexer 114, and terminal 5 carries output signals to the multiplexer indicative of a data signal being held in the director section.

The series arrangement of the direction sections thus allows a "first come, first served" action. The total propagation time to activate the fourth store 111 (FIG. 1) i.e., the delay which occurs before a peak time is recorded with all but the last store full, is approximately 4 $\mu$sec., made up of the delays in six gates, a bistable circuit, and a monostable circuit, and including its pulse width. This propagation time produces no additional error in recorded times even if a clock frequency of 100 kHz. is used. At the output of the fourth director section, a final bistable circuit may be used to give a data "overflow" indication. The capacitor C6 (FIG. 4) is used in conjunction with a level-sensing buffer (not shown) to overcome the logic hazard of spike propagation through the gates due to differences in switching times of the dissimilarly loaded complementary outputs.

The multiplexer 114 comprises four identical sections, one of which is shown in FIG. 6, to maintain the correct 1-2-3-4-1 cyclic order for unloading the stores 108, 109, 110, 111 and resetting the director bistable circuits. As shown in FIG. 6, the section comprises an input OR-gate 160, a NAND-gate 161, an output AND-gate 162, a bistable circuit 163 having an AND-gate 164 connected to its reset terminal and a monostable circuit 165 with an AND-gate 166 connected at its input.

The output of each section at terminal 6 constitutes a transfer control line and is applied to the shift drive gate, the output gate to the punch register, and to the reset facilities in the serializer (FIG. 7) corresponding to the appropriate seven-decade or four-decade register thereof. The input terminal 7 carries "cycle done" pulses from the three-decade counter of the serializer (FIG. 7). The output terminal 8 provides signals to deinhibit the next section of the multiplexer. The input terminal 9 receives the signals from the preceding section, thus deinhibiting this section. Terminals 10 to 12 are transfer control lines from other sections in sequence, the sections being connected in parallel through each OR-gate 160. Interconnection of the OR gate inputs at leads 10–12 provides an inhibit function overridden only on reset of the immediately preceding director section in the cyclic sequence. The monostable circuit 165 creates a blanketing period before initiating reset of the associated director section to allow for gating delays in the serializer.

The serializer is shown schematically in FIG. 7. It comprises a 4 counter 170; a 3 counter 171; a 7-4 counter 172; an input OR-gate 173 taking four transfer control lines at terminal 17; and other logic units as shown in the drawing.

All the counters are standard binary units gated or reset to provide outputs at the count radix shown. A pulse output monostable circuit 174 is added to the 4-counter to allow gated operation of the "print" signal to the punch control logic. This 4-counter provides shift pulses for the four binary bits making up each binary coded decimal (BCD) digit in the stores 108–111. It is essential that the delay round the 4-counter loop, including the width of the monostable pulse, does not exceed the combined width of the shift pulse and the delay in its production, or else an extra pulse will be produced from the closure of the clock gate, giving rise to data skewing. The 7-4 counter counts the decades (BCD digits) as they are unloaded on to tape and is reset to the complement of 7 or 4 depending on which store is being unloaded. The 3 -counter adds to each BCD number representing a peak time the terminating character required by the tape punch code and a variable character, usually a flexowriter carriage return.

In FIG. 7, terminal 13 carries the shift pulse output; terminal 14 receives shift latch pulses from the data overflow circuit; terminal 15 receives "punch read" signals from the synchronizer; and terminal 16 provides output "print" order to the tape punch.

Each decade (BCD digit) is held in a punch register before printing, which provides a static signal to allow lateral parity to be gated to the appropriate punch control lines. Punch synchronization and solenoid drive circuitry for the gated signals from the punch register are of conventional design.

Figure 8:
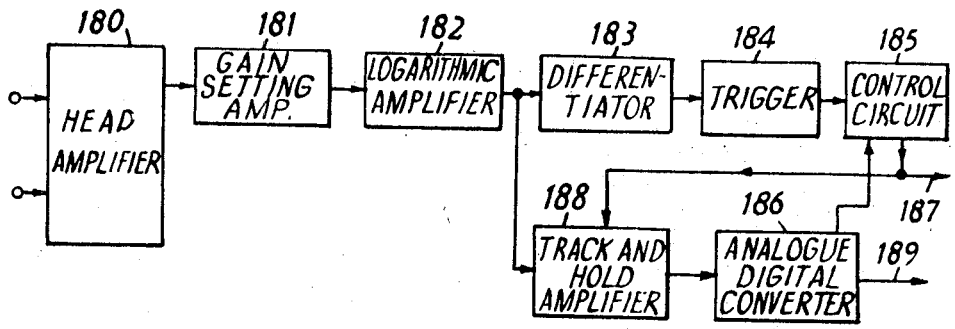
FIG. 8 is a block schematic diagram of a modified form of analogue unit based on operational amplifiers.

FIG. 8 illustrates a modified form of the analogue unit of the system of the present invention, which generally corresponds to the block units 102–106, 118 and 119 of FIG. 1.

The analogue unit of FIG. 8 is based on operational amplifiers, i.e., analogue computing amplifiers, and may be used in conjunction with a magnetic core storage unit. The unit comprises a head amplifier 180 at the spectrometer output, this amplifier having a high input impedance (for example of the order of $10^{13}$ $\Omega$), differential floating inputs, high common mode rejection, moderate gain of the order of 100, and a bandwidth as broad as is required by the system.

The head amplifier output is fed to a gain setting amplifier 182 which provides additional, variable gain and has a variable bandwidth. Offset voltages from the amplifier 180 are backed off between the amplifiers 180 and 181 or are subtracted by the gain-setting amplifier. These two amplifiers, for input signals of a positive sense, should both be of the same sense, i.e., both should "invert" or "not invert" the signals. For systems with suitable voltage levels, these two amplifiers 180, 181 may be omitted.

The output of amplifier 181 is fed to a logarithmic amplifier 182 whose function may be represented by:

$$e_{out} = K\log_e e_{in}.$$

It is usually sufficient for this amplifier to cover three decades of voltage amplitude. A function of this amplifier is to remove baseline noise.

The logarithmic amplifier 182 is followed by a differentiator 183, corresponding to the peak-shaping unit 104 of FIG. 1. For low to medium frequency operation a conventional differentiating amplifier may be used, but for high frequencies, because of stability problems, it is preferable to use a bonded open-loop amplifier or comparator.

The trigger circuit 184 receiving the output of the differentiator 183 will be dependent for its circuitry on the preceding differentiator. For low to medium frequency operation, as mentioned above, a transistor-transistor logic Schmidt trigger can be used, adjusted for zero volt working, or alternatively an operational amplifier comparator and Schmidt trigger. For high-frequency operation the circuit 184 must be a comparator and Schmidt trigger for accurate maximum pickoff at voltages above zero.

The trigger circuit output is passed to a control circuit 185 which comprises a transistor-transistor logic flip-flop which is reset by "conversion completed" pulses from an analogue-digital converter 186 whose function will be described alter. The output from the control circuit 185 is fed on line 187 to the storage control logic such as the director.

The aforementioned components of the analogue unit of FIG. 8 are concerned with the measurement of the ion masses, i.e., the positions of the spectral peaks in time. To provide an indication of the peak intensity the analogue unit includes a track and hold amplifier 188 and the analogue-digital converter 186. The amplifier 188 has input connections from the logarithmic amplifier 182 and from the control circuit 185, and provides a track and hold facility over the signal range of the logarithmic amplifier. The converter 186 may be for example a 10-bit unit with a 10 $\mu$sec. conversion time, and provides intensity signals on output line 189.

The hybrid analogue-digital system described above offers a number of significant advantages over the conventional, solely digital method. The analogue system is immediately concerned with the most important parameter available from a high resolution spectrum, the exact mass (or position with respect to time) of a peak, rather than with its intensity. For scans under conditions of good ion statistics this may be determined directly using only one parameter per peak. For peaks containing few ions, there will be several maxima across a peak width, and the differentiator will give a time reading corresponding to each maximum which, if intensity values are recorded at the same time, can be treated in the same fashion as the conventional centroid calculations.

Analogue data reduction at source allows a higher hardware speed limit, as the system is independent of any fixed analogue-digital conversion sampling rate; because no thresholding device is necessary, the ultimate limit of sensitivity is higher also. The concept of separate circuitry for determining time and intensity for a peak means that the time resolution of the system can be increased considerably, up to the maximum working frequency of the fastest integrated circuits (which is of the order of tens of megacycles), giving an attainable measuring precision of hundredths of a part per million.

In addition, the hybrid system is a self-contained unit, providing an inexpensive yet fundamentally versatile digital facility for any high or low resolution electrically recording mass spectrometer, and needing only a remote general purpose computer for its calculations. As an "active interface" between the spectrometer and computer it allows the full power of the digital machine to be concentrated on the arithmetic of the reduction process rather than its control, thus ultimately allowing the computer to be more fully concerned with the chemical interpretation of these data.

I claim:

1. A mass spectrum analyzer comprising analogue means operative to detect the maximum of each peak of a spectrometer output signal and therefrom provide only control signals coincident with each peak maximum to define the positions of the peak maxima in time, signal generating means providing successive scan time-indicating signals, an output interface, director means connected to receive said control signals and operative to direct the simultaneously available scan time signals from said generating means to said output interface, and means operative to measure the amplitude of the spectral peaks and means for providing at said output interface signals interface signals indicative of the intensity of each peak maximum.

2. A mass spectrum analyzer as claimed in claim 1, which includes buffer storage means into which said selected scan time signals are initially directed under the control of said director means, and encoder means at the output side of said buffer storage means for converting the signalled scan time signals into a form suitable for application to said output interface.

3. A mass spectrum analyzer as claimed in claim 2, wherein said buffer storage means comprises a plurality of registers which are sequentially available to receive the scan time signals and are each connected to said director means to control the accessibility thereof, and multiplexer and serializer means connected to the outputs of said registers and effective to read out data to said encoder means at an appropriate rate and time.

4. A mass spectrum analyzer as claimed in claim 1, wherein said analogue means comprises a differentiating circuit providing the waveform derivative of the spectral signals, and a trigger circuit operative to provide a pulsed control signal in response to the cutting of a datum level by the differentiated waveform.

5. A mass spectrum analyzer as claimed in claim 4, wherein said analogue means includes a logarithmic amplifier connected to receive the spectrometer output signal and to provide the input to said differentiating circuit.

6. A mass spectrum analyzer as claimed in claim 1, wherein said signal generating means comprises a clock pulse generator and a counter arranged to provide on each of a plurality of output lines a series of progressively increasing multidigit parallel-mode bits indicative respectively of the total number of unit time intervals between successive pulses from the clock pulse generator and the instant of commencement of each spectrometer scan cycle.

7. A mass spectrum analyzer as claimed in claim 1, wherein said amplitude measuring means comprises a multilevel peak height-sensing device connected to a counter.

8. A mass spectrum analyzer as claimed in claim 1, wherein said amplitude measuring means comprises an analogue to digital converter.

9. A mass spectrum analyzer as claimed in claim 1, wherein the output interface is connected to a paper tape punch.

* * * * *